United States Patent
Baumann et al.

(10) Patent No.: US 6,569,326 B1
(45) Date of Patent: May 27, 2003

(54) FLUID FILTER WITH A CENTRAL COMPONENT WHICH CAN BE ASSEMBLED

(75) Inventors: Dieter Baumann, Greven (DE); Wilhelm Ardes, Ascheberg (DE)

(73) Assignee: Ing. Walter Hengst GmbH & Co. KG, Münster (DE)

( * ) Notice: Subject to any disclaimer, the term of this patent is extended or adjusted under 35 U.S.C. 154(b) by 0 days.

(21) Appl. No.: 09/856,207

(22) PCT Filed: Sep. 15, 2000

(86) PCT No.: PCT/DE00/03212
§ 371 (c)(1),
(2), (4) Date: Aug. 13, 2001

(87) PCT Pub. No.: WO01/21278
PCT Pub. Date: Mar. 29, 2001

(30) Foreign Application Priority Data

Sep. 17, 1999 (DE) ..................................... 299 16 267 U
Oct. 6, 1999 (DE) ..................................... 299 17 562 U

(51) Int. Cl.⁷ ............................................. B01D 35/16
(52) U.S. Cl. ...................... 210/232; 210/248; 210/429; 210/440; 210/454; 210/457
(58) Field of Search ................. 210/232, 248, 210/437, 440, 457, 418, 428, 429, 236, 433.1, 454, 455

(56) References Cited

U.S. PATENT DOCUMENTS

| | | | |
|---|---|---|---|
| 5,516,425 A | * | 5/1996 | Brieden et al. ............. 210/232 |
| 5,556,542 A | | 9/1996 | Berman et al. ............. 210/232 |
| 5,814,215 A | | 9/1998 | Bruss et al. ................ 210/130 |
| 2002/0134726 A1 | * | 9/2002 | Ardes ........................ 210/440 |

FOREIGN PATENT DOCUMENTS

| | | |
|---|---|---|
| BE | 1 011 567 A | 11/1999 |
| DE | 3903675 A1 | 9/1990 |
| DE | 296 10 290 U1 | 10/1996 |
| DE | 196 52 603 A2 | 6/1998 |
| DE | 298 15 023 U1 | 11/1998 |
| WO | WO 99/11356 | 3/1999 |

* cited by examiner

Primary Examiner—Matthew O. Savage
(74) Attorney, Agent, or Firm—Lahive & Cockfield, LLP

(57) ABSTRACT

The invention relates to a fluid filter, such as an oil filter for an internal combustion engine, comprising a filter housing which can be closed by a screw lid, a filter element and a central, approximately tubular component which projects into the interior of the filter, whereby the central component has bearing surfaces which are used to fix said component into the filter, so that it cannot rotate. The central component and the filter housing have projections and corresponding undercuts which interact with the projections, in order to fix the central component using a detent or snap-fit connection. The invention is characterized in that the lid, the filter element and the central component can be connected to form a joint installation assembly which is easy to handle, whereby the central component is mounted so that it can be rotated about its longitudinal axis in relation to the lid and that guide elements are provided in the filter housing which interact with the bearing surfaces, in such a way that the latter form of rotational lock for the central component during the mounting of the installation assembly, before the central component is fixed by the detent or snap-fit connection, thus allowing said connection to take place.

8 Claims, 4 Drawing Sheets

FLUID FILTER WITH A CENTRAL COMPONENT WHICH CAN BE ASSEMBLED

BACKGROUND OF THE INVENTION

The present invention relates to a fluid filter suitable for use in an internal combustion engine.

Conventional fluid filters are described in German Utility Model Application 299 15 841.1.

The central component is made somewhat tubular. "Somewhat tubular" means that a closed tube need not be provided but the central component can have openings and form a supporting mandrel known of itself or a drain mandrel likewise known of itself or a filter bypass valve likewise known of itself. In particular, provision can be made to make the central component in the shape of a combination component both as a supporting mandrel and as a drain mandrel and/or filter bypass valve.

The filter housing can be molded fixedly onto a motor housing part, cast for example, so that assembly of the filter takes place in an automobile factory for example with the filter housing provided on the motor being fitted with the remaining components of the filter supplied.

Simple and rapid assembly of the central component can be provided by means of a latching or snapping connection, with one or more projections or recesses being provided on the filter housing itself or on a component connected with the filter housing, and provided with one or more corresponding recesses or projections on the central component. In order to achieve good spring elasticity during latching, the projections and/or undercuts cannot extend around the entire circumference of the central component but only around portions of this circumference.

A rotation-resistant mounting of the central component that prevents movement around the lengthwise axis of this component ensures that latching between the central component in the filter housing is retained and the central component does not undesirably come loose from the filter housing. This rotation blocker can be ensured for example by an additional valve body which can be mounted off-center on the central component itself.

SUMMARY OF THE INVENTION

The goal of the present invention is to provide an improved filter that is economical and can be mounted quickly.

In other words, the invention proposes making a first jointly manageable assembly which comprises the lid, the filter insert, and the central component. Such a uniformly manageable assembly can be inserted simply, economically, and rapidly by machine into the filter housing. The entire installation group is rotated to screw down the lid. The central component is likewise rotationally driven by the fact that its connection with the filter insert and/or with the lid permits the transfer of certain rotational moments, for example by a clamping force between the connected parts or by connecting ribs that break if certain rotational moments are exceeded, or the like.

It is provided that, during the assembly process, the central component has its contact surfaces against or on the corresponding projections of the filter housing. The resulting rotational movement which the central component executes together with the lid ensures that the central component reaches the desired rotational position from any initial rotational position in which the central component is aligned in a definite position in terms of its rotational angular position which firstly ensures secure latching with the filter housing and also ensures that the central component is aligned in this latching position to form the desired rotational latch.

For this purpose, the central component is mounted rotatably relative to the lid around its lengthwise axis, for example by overcoming the above-mentioned clamping forces by breaking the aforementioned connecting ribs or the like. Provision can be made such that the central component is held directly on the lid or on the filter insert, whereupon the central component is mounted rotatably relative to the filter insert and/or the latter is mounted rotatably relative to the lid. In this manner a screwing movement for the lid is made possible with which it is screwed into the filter housing while at the same time the central component, resting against the projection on the filter housing side, retains its rotational angular position and does not rotate with it any further.

According to the invention, guide means are provided internally on the filter housing which serve to prevent rotation during assembly and which cooperate with the contact surfaces of the central component. These guide means ensure the correct rotational angular position of the central component during further assembly. During an additional screwing process of the lid, the central component therefore remains in its optimum rotational angular position and is merely introduced increasingly further into the filter housing because of the screwing process until the central component and the filter housing latch.

The projections which perform the rotational lock during assembly by cooperating with the contact surfaces of the central component can be formed by a nose or strip that projects into the interior of the filter housing, but the projection can also be formed by the side of a groove when the contact surface of the central component extends into this groove.

Advantageously, the rotational lock effective during operation and provided in any case, in addition to its actual goal of preventing inadvertent loosening of the central component from the filter housing while the filter is operating, can also be used to create an introduction aid or rotational lock during the assembly of the central component.

For this purpose, a projection provided on the filter housing side can be provided not only in the raised position of the filter housing in which it cooperates in the operating state of the filter with the corresponding contact surfaces of the central component. Instead, this projection on the filter housing side can be extended to the lid opening of the filter housing since the central component is usually inserted by this opening.

This extension of the projection can be made economically and also permits early contact between the contact surfaces on the central component on the one hand and the projection on the filter housing on the other hand so that the central component is reliably guided into the desired position during its assembly.

BRIEF DESCRIPTION OF THE DRAWINGS

An embodiment of the invention will be described in detail below with reference to the drawings.

DESCRIPTION OF ILLUSTRATED EMBODIMENT

Figure 2:
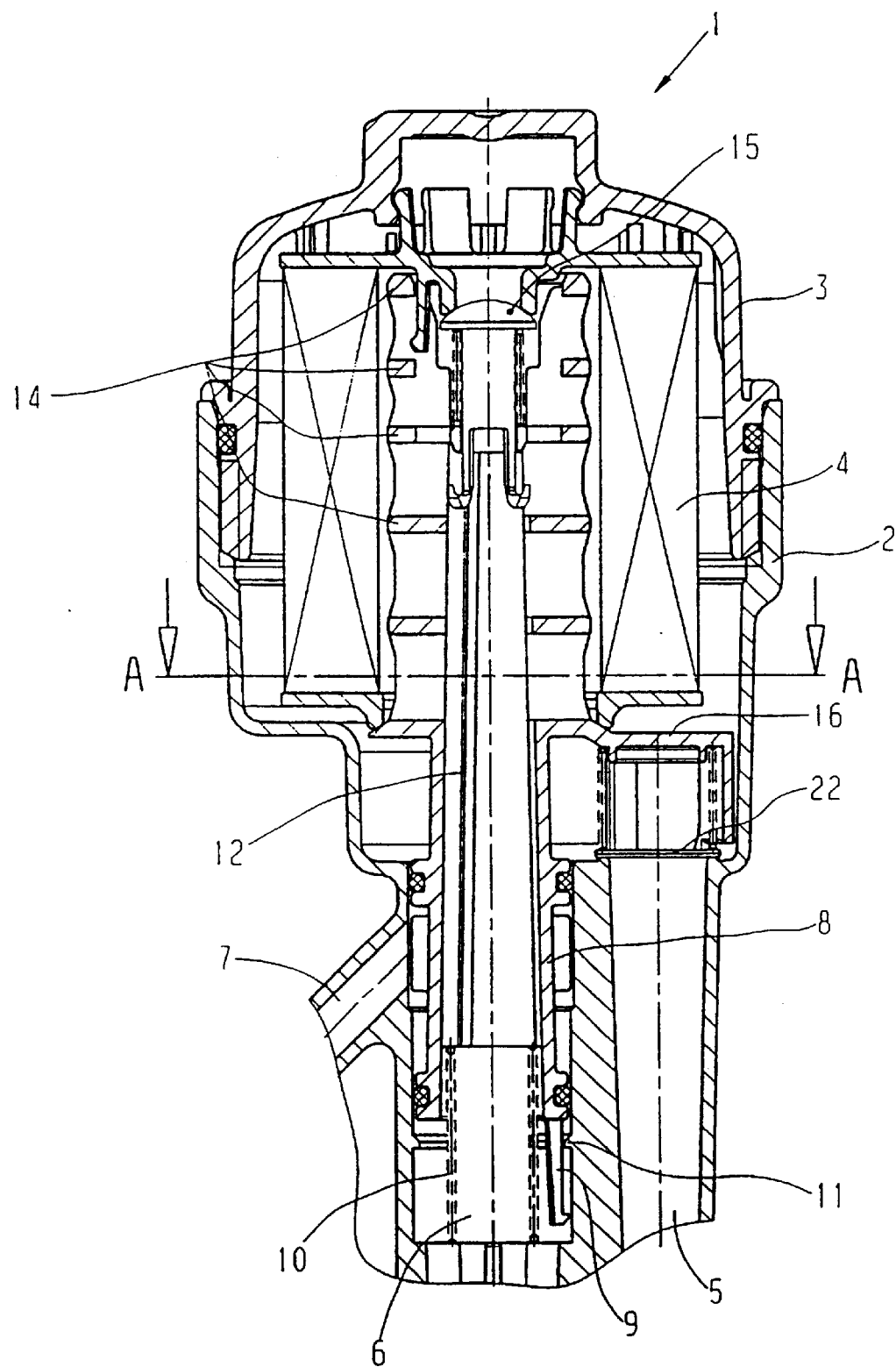
FIG. 2 shows a closed filter in its usual operating state with the mounted installation group.

In FIG. 2, reference numeral 1 generally designates a filter with a filter housing 2, a lid 3, and a replaceable filter insert 4. The filter 1 shown is provided as an oil filter for an internal combustion engine. It has an inlet 5 for clean filtered oil and a drain line 7 which is closed in FIG. 2 and can be drained from the interior of the filter only when changing filters, in other words when changing filter insert 4, without this drained oil being mixed with the clean oil since there is no connection 2 to outlet 6.

A central component 8 designed as a drain mandrel is provided in filter 1. Central component 8 has a spring claw 9 at its lower end which holds central component 8 against the action of a spring 10 by abutting a projection 11 provided in outlet 6. Spring claw 9 and projection 11 form projections and undercuts which cooperate with one another alternately. They also ensure reliable retention of central component 8 with very high forces of spring 10.

Figure 3:
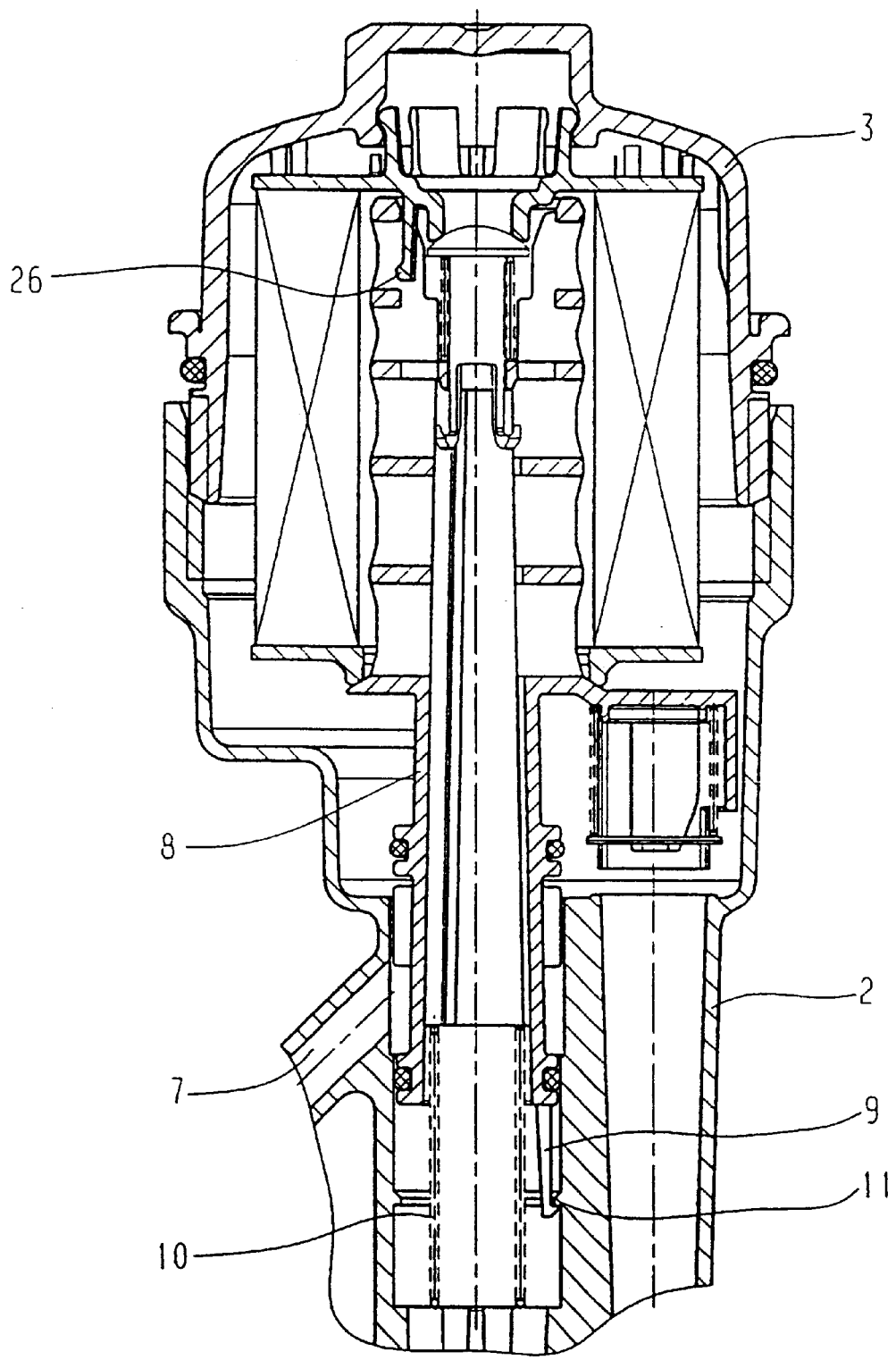
FIG. 3 shows the partially opened filter of FIG. 2 in which the lid is partially unscrewed.

In particular, it is clear from FIG. 3 that, with lid 3 already partially unscrewed, spring 10 lifts central component 8 until this component 8 is held only by the latching or snapping connection between spring claw 9 and projection 11. In this raised state of the drain mandrel there is a connection between the filter interior and drain line 7 so that oil in filter 1 is drained off through drain line 7 before lid 3 is completely unscrewed. In this way, low-contamination removal of filter insert 4 is made possible.

Central component 8 is designed as a combination component. On the one hand it forms the above-mentioned drain mandrel. In addition, it has lengthwise ribs 12 with which it extends into the interior of filter insert 4. In this area, lengthwise ribs 12 have a plurality of horizontal ribs 14 so that the central component 8 in this area forms a supporting mandrel for filter insert 4. In addition, central component 8 has a filter bypass valve 15 as well as a return-blocking valve 17 on a laterally projecting plate 16 with a plate-shaped valve body 22.

Figure 4:
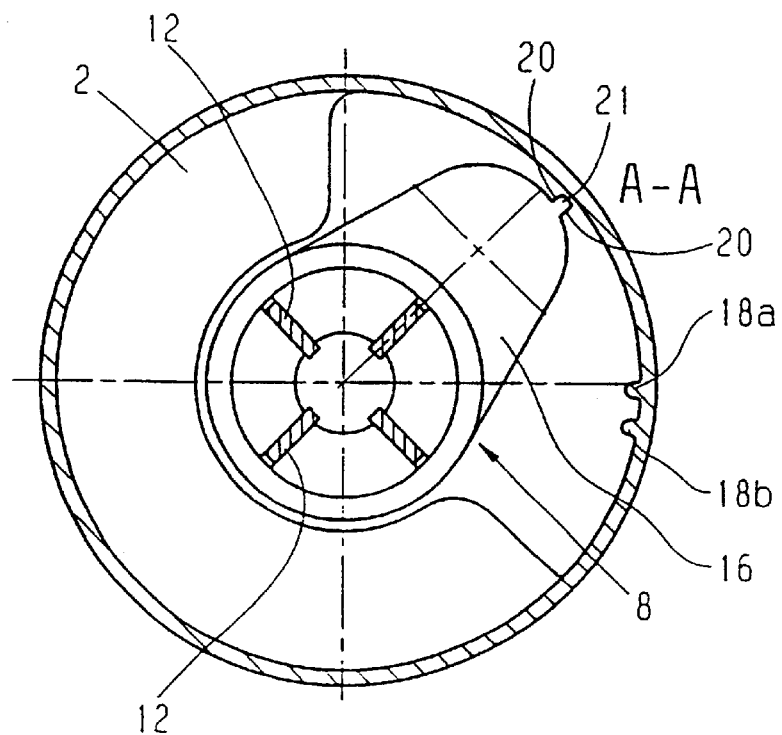
FIGS. 4 and 5 each show a section through the filter in FIG. 2 along lines A—A, initially during the assembly of the filter and with the filter in the final assembled state.
Figure 5:
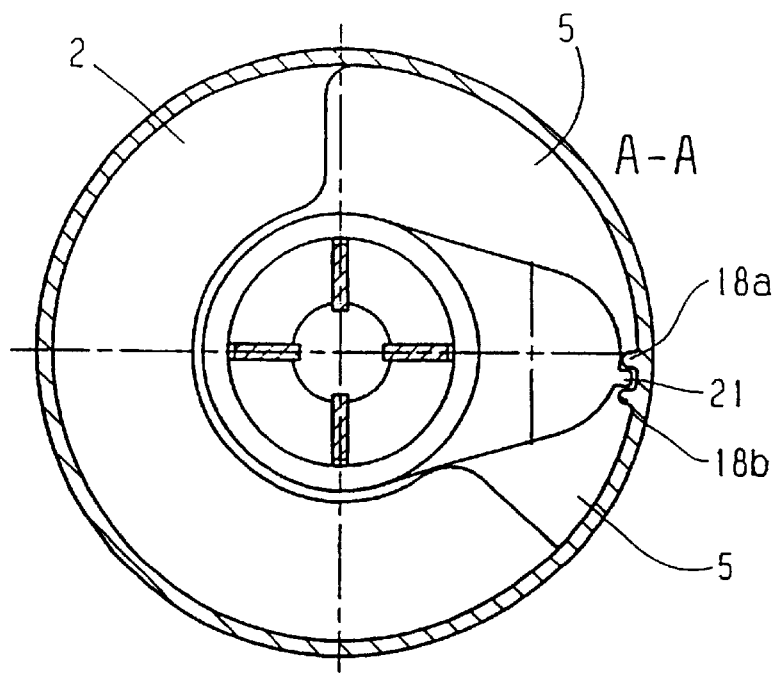

On the inside wall of filter housing 2, as is clear in particular from FIGS. 4 and 5, two shaped projections 18a and 18b are provided, designed as strips running lengthwise of filter 1. Central component 8 has a shaped nose 21 whose side edges form contact surfaces 20 by which central component 8 abuts projections 18 so that, as FIG. 5 shows, rotational movement of central component 8 around its lengthwise axis is prohibited when component 8 is in the mounted state.

Figure 1:
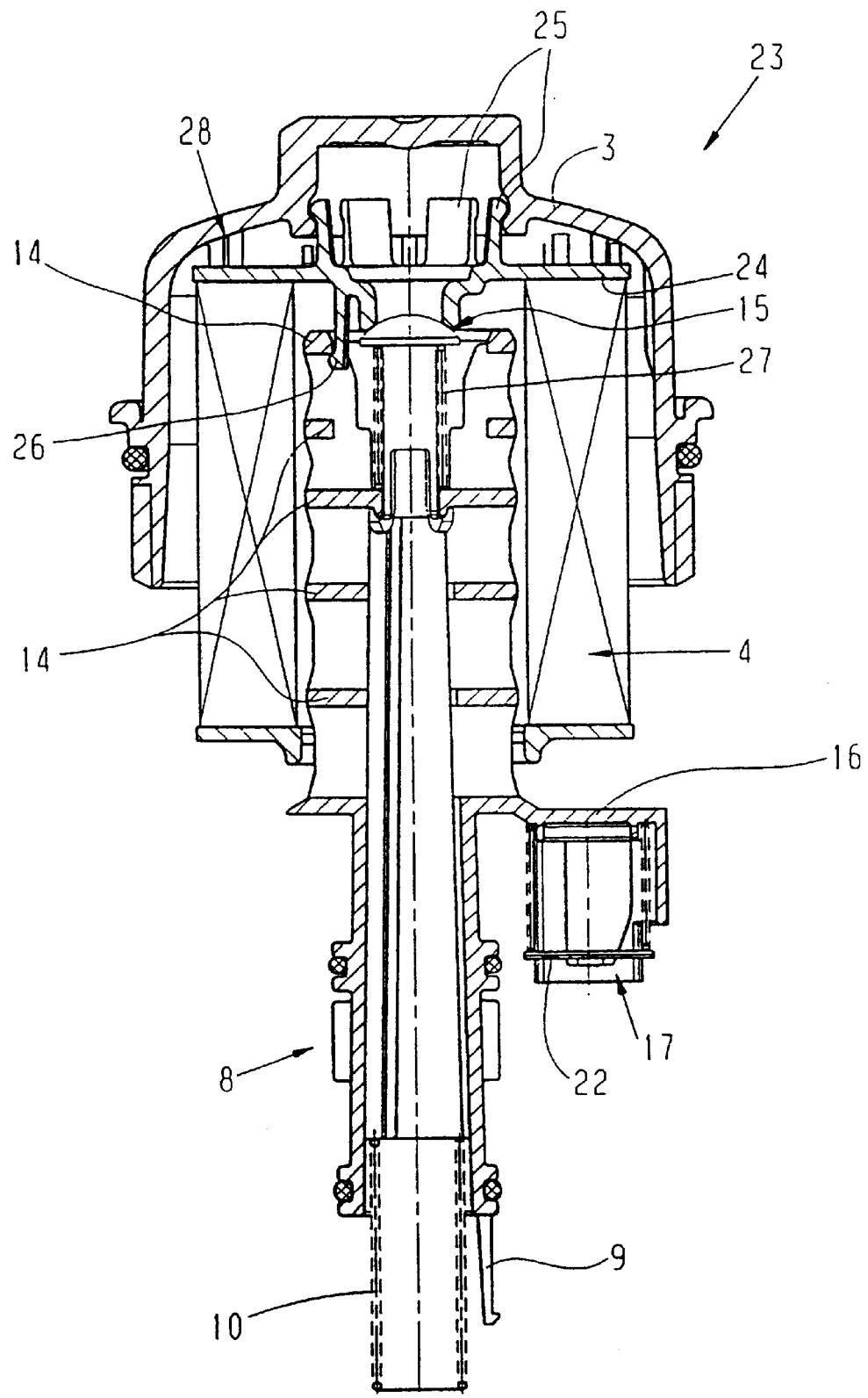
FIG. 1 shows an installation group for a fluid filter.

It is clear from FIGS. 1 to 3 that projection 11 is formed by a corresponding undercut in the wall of outlet 6 as a circumferential rib while spring claw 9 is provided only along a limited angular range around the circumference of central component 8 to permit good spring mobility. Regardless of the angular position of central component 8, it is therefore held securely in filter housing 2 as soon as central component 8 has been inserted deep enough into filter housing 2 and spring claw 9 has gripped behind projection 11. Instead of the one spring claw 9 shown, two or more spring claws 9 can be provided to ensure an especially secure seat for central component 8 in filter housing 2.

It is clear from FIG. 1 that there is an installation group 23 comprising lid 3, filter insert 4, and central component 8. An upper end disk 24 of filter insert 4 is connected releasably with lid 3 by a plurality of spring hooks 25. On the one hand, the contour of lid 3 and spring hooks 25 permits rotational mobility of filter insert 4 within lid 3; on the other hand, the clamping force of spring hooks 25 ensures up to a certain resistance that the filter insert 4 can be rotated together with lid 3.

The upper end disk 24 also has one or more matching hooks 26 extending into the interior of filter insert 4 which fit behind the uppermost of ribs 14 and thereby hold central component 8 and filter insert 4. This provides a nonrotating connection between filter insert 4 and central component 8. For this purpose wings are provided on central component 8 which extend radially outside filter bypass valve 15 to uppermost rib 14 and form a stop for matching hooks 26.

A spring 27 of filter bypass valve 15 is relaxed in the state of installation group 23 shown in FIG. 1 or, in contrast to the embodiments shown, provision can also be made such that the valve mushroom of filter bypass valve 15 does not abut the associated valve seat of upper end disk 24 in order in this way to ensure a good rotational mobility of central component 8 which carries this valve mushroom relative to filter insert 4.

During installation, entire installation group 23 is held against lid 3 by a screwing tool and introduced into filter housing 2. Central component 8 is the first to enter filter housing 2. The screwing tool of installation group 23 performs a continuous rotational movement in this position so that, by means of the clamping force, a spring hook 25 is supported by the net weight of the individual components of installation group 23 and is rotated by the non-rotational arrangement of latching hooks 26 on central component 8, as are filter insert 4 and central component 8 together with lid 3 around its lengthwise axis.

FIG. 4 shows purely as an example how central component 8 can be aligned within filter housing 2. The rotational movement of the lid in which central component 8 is entrained clockwise can initially take place without impediment. Looking in the axial direction of filter 1, of the two projections 18, projection 18b shown at the bottom in FIGS. 4 and 5 is higher in filter housing 2, in other words closer to lid 3 than projection 18a shown at the top in FIGS. 4 and 5. During the rotational movement of lid 3 and the resultant rotational movement of central component 8, this means that contact surface 20 in the front in the rotational direction presses against projection 18b when central component 8 is in the rotational angular position according to FIG. 5.

The further rotational movement caused by the screwing tool causes lid 3 to be screwed increasingly into filter housing 2. The fact that central component 8 is mounted rotationally movably relative to lid 3 allows relative movement between these two parts of installation group 23 so that central component 8 remains in its rotational angular position shown in FIG. 5 and is simply moved axially further by the further screwing of lid 3 and is thereby introduced to a greater depth into filter housing 2. In the rotational angular position of central component 8 shown in FIG. 5, projection 11 can cooperate with spring claw 9 of central component 8 in outlet 6 of filter housing 2 so that, when a corresponding screwing depth of installation group 23 is reached as shown in FIG. 3, a latching connection between central component 8 and filter housing 2 is created.

This is followed by additional automatic screwing until lid 3, as shown in FIG. 2, is screwed completely into filter housing 2.

When the filter is exchanged later, lid 3 is unscrewed again from its operating position shown in FIG. 2. When it has reached the position shown in FIG. 3, the oil remaining inside the filter can be drained off through drain line 7. At the same time, central component 8 is held in filter housing 2 by the latching function of spring claw 9 and projection 11. Unscrewing lid 3 causes the comparatively much weaker latch between central component 8 and filter insert 4 to be released so that lid 3 together with filter insert 4 can be removed from the filter while central component 8 remains integral with the filter, in other words on filter housing 2.

When a new filter insert 4 is inserted, provision can be made to create special material-saving replacement filter inserts in which upper end disk 24 is not provided with latching hooks 26. With smaller quantities, such a differentiation of the filter inserts can be economically avoided and an exchange filter insert with such latching hooks 26 can be provided.

FIG. 1 schematically indicates spacing ribs 28 of which one or more are provided on lid 3 and/or one or more are provided on filter insert 4. These spacing ribs 28 serve to secure filter insert 4 from tilting movements within lid 3. They can be provided with a corresponding radial overlap in the form of dogs that cooperate with one another in order to ensure a rotary entrainment of filter insert 4 when lid 3 is rotated by the screwing tool. At the beginning of assembly, the rotary movement of lid 3 can be transferred to central component 8 fastened to filter insert 4 so that the latter has its contact surfaces 20 securely against projection 18b. Such dogs could permit higher rotational forces by comparison with filter hooks 25 and make it possible to use weaker spring hooks 25 that facilitate removal of filter insert 4 from lid 3 when changing the filter.

What is claimed is:

1. A fluid filter comprising a filter housing having a lid opening closable by a lid, a filter insert and a central component extending into an interior of the filter housing, said central component includes contact surfaces to hold said central component nonrotatably in the filter housing, and wherein the central component is held to the filter housing by a latching or snapping connection, wherein the lid, the filter insert, and the central component are adapted to be connected together to form a jointly manageable installation group, with the central component being rotatably mounted relative to the lid around a lengthwise axis, and guide means being provided internally on the filter housing for cooperating with the contact surfaces in such a way to hold said central component nonrotatably in the filter housing during assembly of the installation group with the filter housing before the central component is secured to said filter housing by means of the latching or snapping connection.

2. Filter according to claim 1, wherein the guide means includes a projection that is extended towards said lid opening.

3. Filter according to claim 1, wherein the central component is releasably connected to the filter insert.

4. Filter according to claim 3, wherein the central component is rotationally movably connected to the filter insert.

5. Filter according to claim 3, wherein the central component is non-rotationally movably connected to the filter insert.

6. Filter according to claim 1, wherein the lid is rotationally movably connected to the filter insert.

7. Filter according to claim 1, wherein the central component comprises a drain mandrel.

8. Filter according to claim 1, wherein the central component comprises a supporting mandrel.

* * * * *